Dec. 27, 1966     H. M. MELZER     3,294,005
APPARATUS FOR PROVIDING AN AIR BARRIER
Filed July 28, 1964
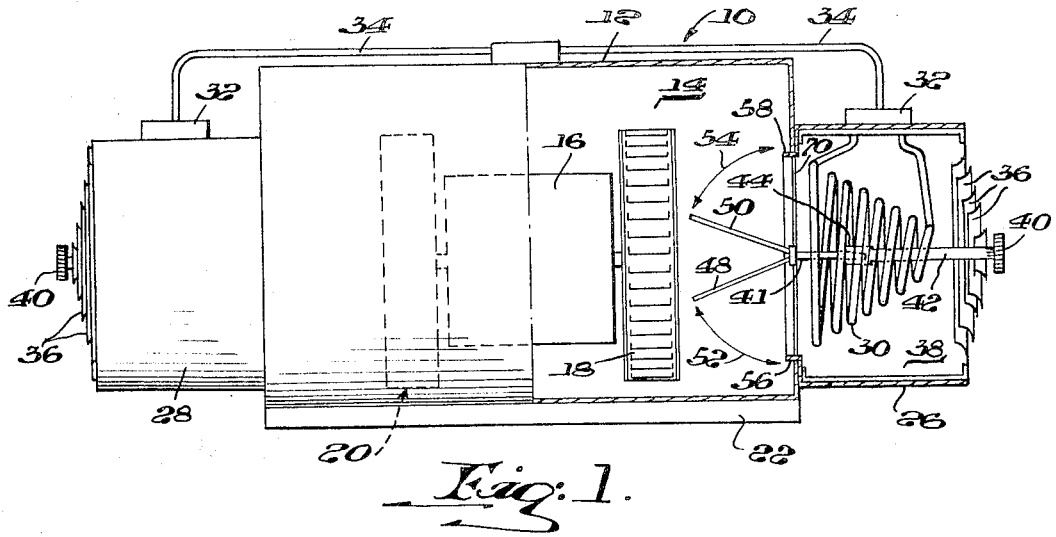
Fig. 1.
Fig. 3.
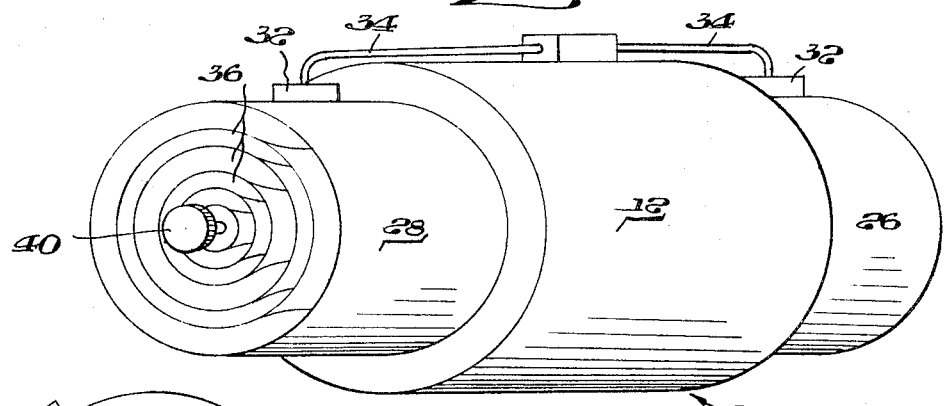
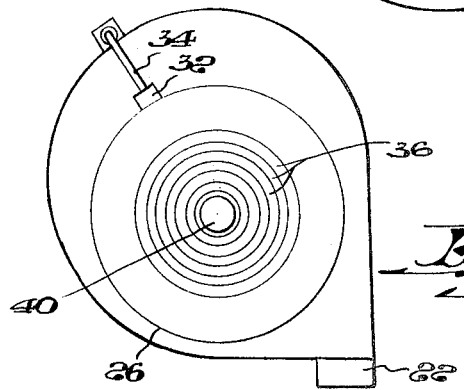
Fig. 2.
INVENTOR.
HERMAN M. MELZER
BY
John A. Young
his ATTORNEY

United States Patent Office 3,294,005
Patented Dec. 27, 1966

3,294,005
APPARATUS FOR PROVIDING AN
AIR BARRIER
Herman M. Melzer, McKeesport, Pa., assignor to National Air Products, Inc., trading as Mel-Aire Company and/or Mel-Aire Company, Inc., Pittsburgh, Pa., a corporation of Pennsylvania
Filed July 28, 1964, Ser. No. 385,729
2 Claims. (Cl. 98—36)

This invention relates to apparatus for producing an air barrier and more particularly, to an apparatus for continuously generating a heated current of air which is directed across the doorway or other access opening to form a barrier to the passage of heat and also serves as a barrier for resisting penetration by insects, flies and other foreign material, such as dirt, pollen and the like.

The advantages of an apparatus for generating an air barrier are generally understood, and the various objects of such arrangement are fuly set forth in my copending application No. 309,523, filed September 17, 1963 and entitled "Apparatus for Generating an Air Barrier." It has been found, however, that for many applications it is desirable to have a flow of heated air move through the apparatus in order to prevent the currents of air from producing a chill to anyone standing in the vicinity of the apparatus during its operation.

Accordingly, it is one of the objects of the present invention to improve upon the structure set forth in said copending application No. 309,523 by providing suitable means in conjunction therewith, for heating the air as it is circulated through the apparatus. In this way, I overcome certain of the stated disadvantages of the unheated flow of air which produces objectionable chills, and drafts, particularly during the winter months when the apparatus is installed in an open doorway.

A further object of the present invention is to provide an economical and efficient apparatus for heating the air as it flows into the apparatus and is raised to a suitable temperature making it possible to eject the air as a barrier.

A still further object of the present invention is to provide a heating chamber through which all of the incoming air for the apparatus is channeled and which contains a helically wound electrical resistance element past which the flow of air is directed and then subsequently moves into the interior of the volute chamber where it is compressed and then directed across the access opening.

It is an important feature of the present invention that a controllable heating effect is producible upon a flow of air as it moves continuously through the apparatus and generates an air barrier of such heated air, the control making it possible to compensate for the ambient air at its prevailing temperature.

Other objects and features of the present invention will become apparent from a consideration of the following description, which proceeds with reference to the accompanying drawings, wherein:

FIGURE 1 is a front elevation view of the apparatus, with the right-hand portion of the casing removed to illustrate the interior of the apparatus;

FIGURE 2 is an end view of the apparatus shown in FIGURE 1; and,

FIGURE 3 is an isometric view of the apparatus shown in FIGURES 1 and 2.

Referring now to the drawings, the apparatus designated generally by reference numeral 10 includes a casing 12 having an interior chamber 14 wherein is mounted a motor 16 with impellers 18 and 20 which are rotated by the motor 16.

Within the casing is a slot 22 which directs the flow of air downwardly or across the passageway or other access opening (not shown) to produce an air barrier of a fast-flowing laminar flow which serves both as a mechanical and a thermal barrier across the doorway. Before the air enters chamber 14, it first passes through end chambers 26, 28 wherein is located a helically wound electrical resistance element 30 having ends connected with a junction box 32 and an inlet line 34, the coil being heated to a suitable degree. The conical shape to the element reduces the resistance to air flow and improves the heat exchange.

Air flows initially through a series of annular inlets 36 and into the interior 38 of the chamber where it flows past the coils 30 to be heated thereby. The coils 30 are dimensioned and are located so that the flow of air through the annular passages between adjoining annular members 36 cause the stream of air to be uniformly heated but even if the air is not uniformly heated, the air tends to be mixed by the impellers 18 and 20 interiorly of the chamber 14 so that the air is of substantialy constant temperature as it emerges from the slot 22. The flow of air can be regulated by means of a knob 40 at the end of a stem 42 having threaded connection 44 with a rod 46. Rod 46 in turn is connected to clam vanes 48 and 50 which can be moved arcuately back and forth in the direction of the arrows 52, 54 either to close or to open access to chamber 14 and thus control the rate of flow into chamber 14. At the extreme position, the clam vanes engage sealingly with seats 56, 58 to completely close against the flow of air from chamber 38 into chamber 14.

In operation, the heating coils 30 are energized to a preferred degree by suitable electrical control means and the motor 16 is actuated from an appropriate source of electrical energy. The impellers 18 and 20 thus rotate continuously, drawing in a flow of air through the annular spaces 36 and into the chamber 38 the flow being directed past the plurality of helically wound coils 30 of the heating element and thence past the opening 70 and into chamber 14. Within chamber 14 the impellers produce a pumping action, effecting superatmospheric pressure conditions within said chamber 14. Equilibrium conditions are reached at an internal pressure within chamber 14 wherein the flow of heated air out of the slot 22 is balanced by the inflow of air through openings 36 with the pumping action maintaining an equilibrium superatmospheric pressure within the chamber 14.

The flow of air from the slot 22 is directed across a doorway or other access opening and produces a barrier which resists the passage of dust pollen, insects and the like and also serves as a thermal barrier. The flow of air is continuous, and is of such dimension, speed and volume that the barrier is an efficient one preventing the passage of foreign material, but permitting unimpeded movement of persons through the doorway.

Because the air is heated, the flow of air is not noticeable so far as its temperature is concerned. A fast flow of air tends to feel cooler no matter what its temperature, and therefore, heated condition of air tends to offset this phenomena. Persons who are standing in the vicinity of the apparatus, do not experience any uncomfortable effect by reason of the flow of air which might tend to be objectionable under some circumstances, as for example, during the winter months when the flow of air might be experienced as having a chill to it. Depending upon weather conditions, the heating element 30 can be regulated to provide the preferred amount of heating. Thus, when the air is quite chill, more current can be directed through the coil 30 and correspondingly when the ambient temperature is greater, then less curent and thus less heating effect is provided by the heating coils 30. Conversely, the amount of flow of air is regulated by adjusting the knob 40 and regulating the angular position of the shells 48, 50 in controlling the size of opening which provides for ingress of air from chamber 38 into chamber 14.

The amount of air flow is a function of the particular application. Typically, a flow of about 1650 cubic feet per minute has been found suitable for an average doorway and which will operate efficiently and yet allow for unimpeded travel through the doorway by pedestrian traffic.

Although the present invention has been illustrated and described in connection with a single example embodiment, it will be understood that this is illustrative of the invention and is by no means restrictive thereof. It is reasonable to be expected that those skilled in the art can make numerous revisions and adaptations to suit individual design requirements and it is intended that such revisions and adaptations which incorporate the herein disclosed principles will be included within the scope of the following claims as equivalents of the invention.

I claim:

1. A device for generating an air flow of prescribed dimension and velocity and directing it across an access door or other opening to serve as a barrier to the passage of heat, insects, and other bodies therethrough, comprising: a casing having a volute-shaped chamber at least partially lined with a sound-suppressing material; a motor and at least one rotatable blower wheel driven thereby and having a plurality of spaced impellers disposed within said chamber and rotatable to effect a substantialy constant superatmospheric pressure internally of said chamber during their rotation by said motor; a discharge slot including a plurality of adjustable vanes for directing the flow of air as it passes through said slot; inlet means at the opposite ends of said casing defined by a plurality of concentric annular inlet passages and including angularly movable baffle means for controlling the effective area of said inlet passages, and a chamber having a plurality of coils of increasing diameter which provide resistance elements effective for heating the flow of air as it passes through said inlet means into said casing.

2. A device for generating an air flow of prescribed dimension and velocity and directing it across an access door or other opening to serve as a barrier to the passage of heat, insects, and other bodies therethrough, comprising: a casing having a volute-shaped pressure chamber; a motor and at least one rotatable blower wheel driven thereby and having a plurality of spaced impellers disposed within said chamber and rotatable to effect a substantially constant atmospheric pressure internally of said chamber during their rotation by said motor; a discharge slot including a plurality of adjustable vanes for directing the flow of air as it passes through said slot; inlet means at the opposite ends of said casing defined by a plurality of concentric annular inlet passages, and including angularly movable baffle means for controlling the effective area of said inlet passages; cylindrical guide means for channeling an inlet flow of air from said inlet means into the path of rotation of said impellers; and a plurality of heating coils comprised of electrical resistance elements which are disposed in the path of air movement as it travels through said inlet means to effect heating of the air which is subsequently directed as a flow of air through said discharge slot.

References Cited by the Examiner

UNITED STATES PATENTS

| | | | |
|---|---|---|---|
| 3,021,775 | 2/1962 | Gygax | 98—36 |
| 3,157,105 | 11/1964 | Tamm et al. | 98—36 |
| 3,215,058 | 11/1965 | Anderson | 98—36 |

FOREIGN PATENTS 506,893  4/1957  Italy.

ROBERT A. O'LEARY, *Primary Examiner.*

W. E. WAYNER, *Assistant Examiner.*